United States Patent

[11] 3,578,933

| [72] | Inventors | Woodrow A. De Smidt;<br>Edward H. Kuhn, Milwaukee, Wis. |
|---|---|---|
| [21] | Appl. No. | 857,512 |
| [22] | Filed | Sept. 12, 1969 |
| [45] | Patented | May 18, 1971 |
| [73] | Assignee | Allen-Bradley Company<br>Milwaukee, Wis. |

[54] CORROSION-RESISTANT ENCLOSURE
7 Claims, 14 Drawing Figs.

[52] U.S. Cl. ................................................. 200/168
[51] Int. Cl. ................................................. H01h 9/04
[50] Field of Search .......................................... 200/168
(G); 317/120

[56] References Cited
UNITED STATES PATENTS

| 3,364,318 | 1/1968 | Bulliet | 200/168(G)(X) |
| 3,378,666 | 4/1968 | Rys | 200/168(G) |
| 3,381,106 | 4/1968 | Rys et al. | 200/168(G) |
| 3,385,945 | 5/1968 | Tums | 200/168(G) |

*Primary Examiner*—H. O. Jones
*Attorneys*—Arthur H. Seidel and Thomas O. Kloehn ABSTRACT: A corrosion-resistant enclosure is disclosed for electrical switches, such as across the line motor starters and safety disconnect switches, that is made of a reinforced resin. The enclosure has a unitary backplate with a backwall and forwardly turned flange, a four-sided body open at the back to receive the backplate and fit snugly about the backplate flange, a sealing material bonding the backplate and body together, and a cover hinged to the body by integral hinge straps that retain the sealed integrity of the enclosure. The components of the enclosure are of molded, reinforced resin having a high degree of resistance to corrosive environments.

Patented May 18, 1971
3,578,933
4 Sheets—Sheet 1
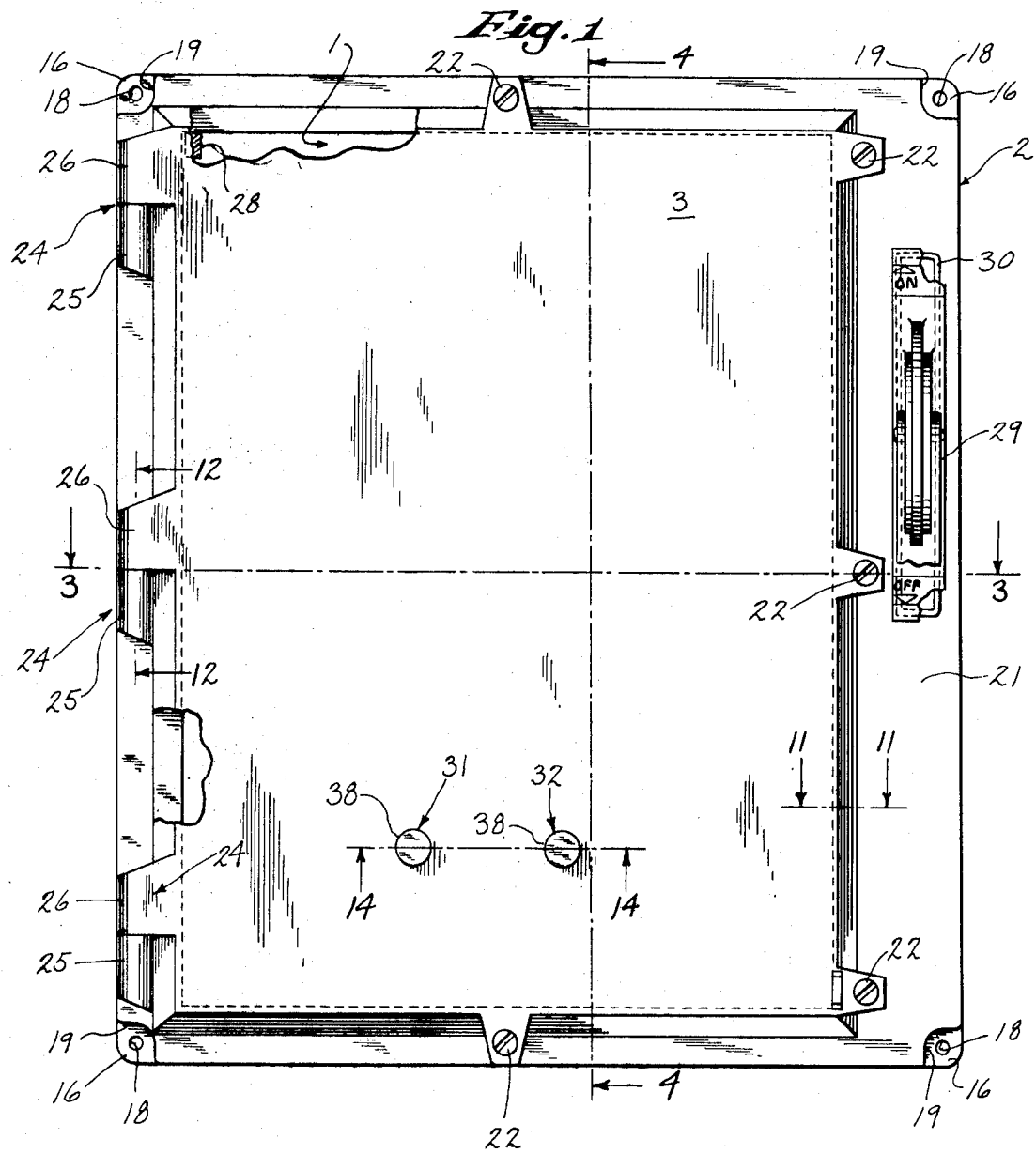
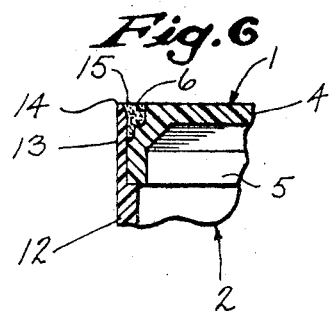
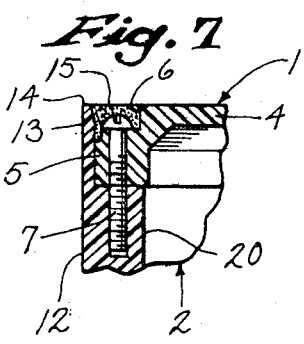
INVENTORS
WOODROW A. DE SMIDT
EDWARD H. KUHN
BY
*Arthur N. Seidel*
ATTORNEY

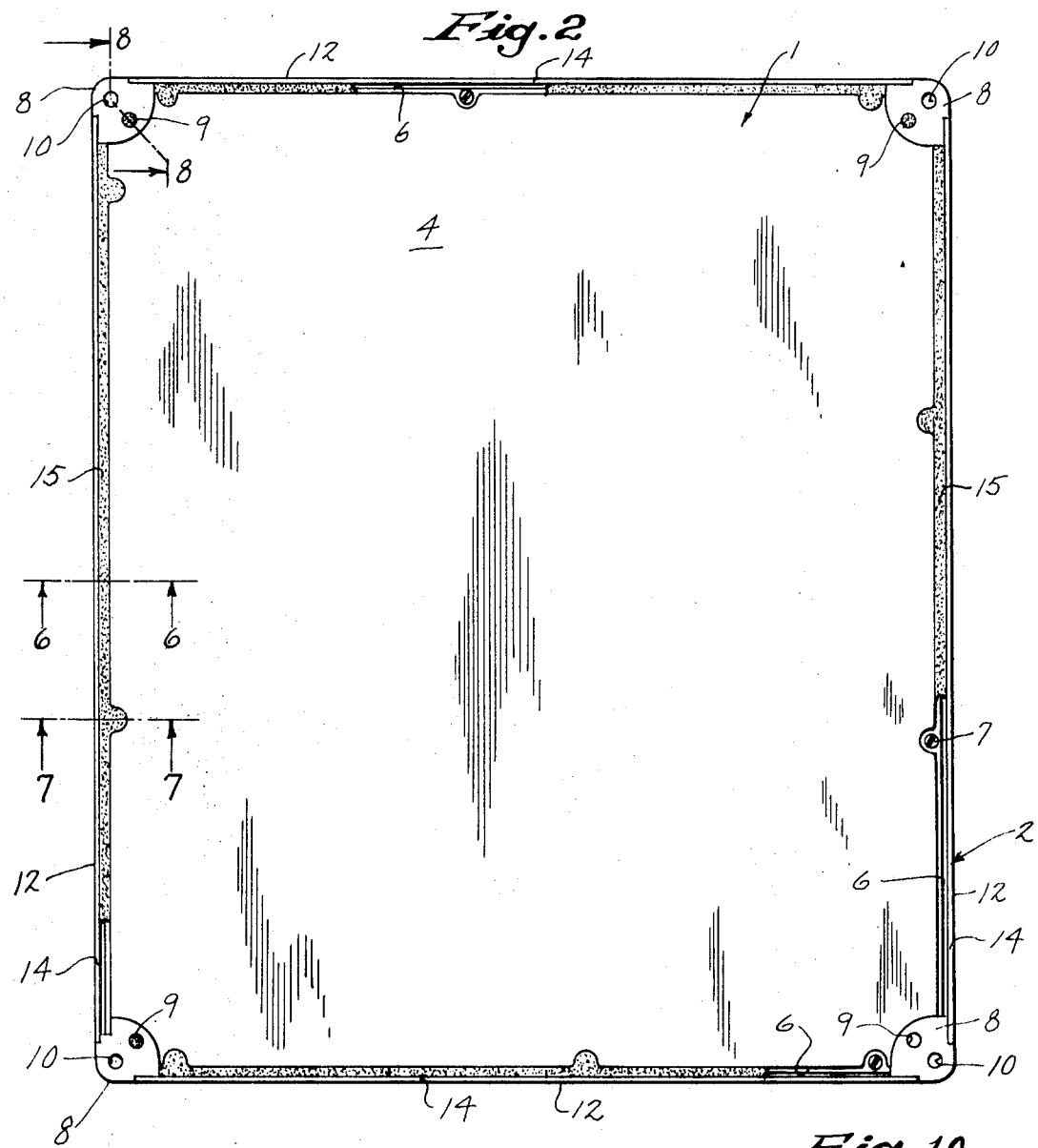

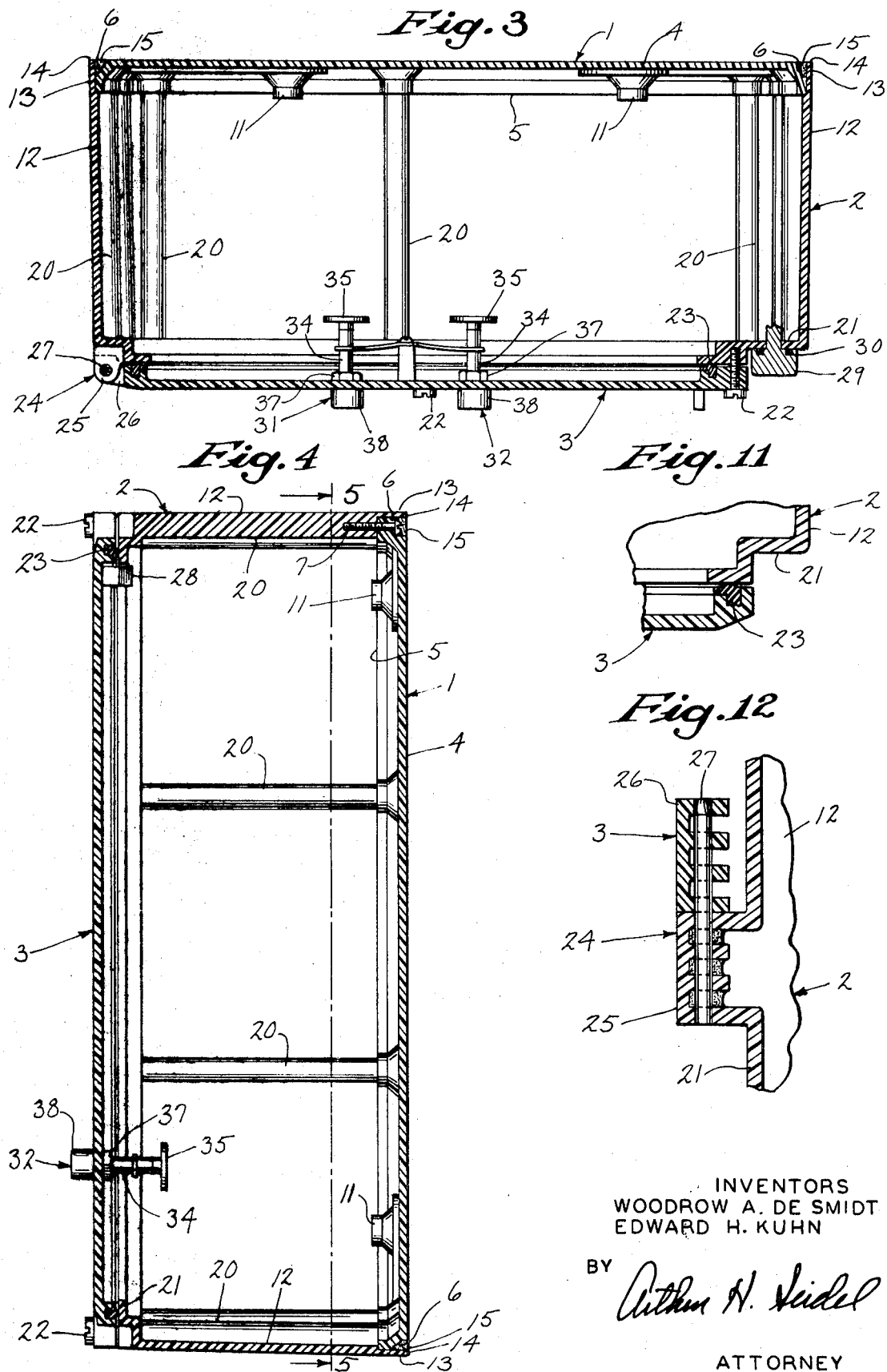

Patented May 18, 1971

INVENTORS
WOODROW A. DE SMIDT
EDWARD H. KUHN

BY Arthur H. Seidel

ATTORNEY 3,578,933

1

CORROSION-RESISTANT ENCLOSURE

BACKGROUND OF THE INVENTION

Motor control switches and other electrical devices are frequently situated in corrosive atmospheres that readily attack the metals and other materials of which they are constructed. It has long been the practice to install switches and devices so situated in enclosures of anticorrosive properties. The present invention relates to this class of enclosure.

One usual type of corrosion-resistant material used for motor control switches and similar apparatus is stainless steel. Such material, however, is subject to attack by some of the more aggressive atmospheres, and in short time may become severely eroded so that replacement is necessary. Other enclosures may have special coatings and surface treatment, but once such protective layers are worn away the vulnerable metal that is exposed quickly erodes and protection for the enclosed electrical equipment is lost.

Corrosion is a matter of very substantial concern, for it has been estimated that equipment is lost.

Corrosion is a matter of very substantial concern, for it has been estimated that equipment loss in industry has reached as high as 6 billion dollars a year. In spite of this large figure, which illustrates the need for corrosive-resistant enclosures, the materials for enclosing electrical apparatus largely remain surface-treated steels and stainless steel. There has been a shift to molding boxes and covers for smaller sized articles from resins, in which the cover can be bolted to the box proper with a gasket therebetween. These have been boxes of small, simple six-sided design, as may be used for individual control relays, switches and pushbutton stations. The introduction of molded resins for these smaller electrical devices has demonstrated improved resistance to corrosion, because of the chemically inert nature of the resin in most all atmospheres.

The enclosing of larger electrical apparatus, such as an across-the-line motor control switch in combination with a disconnect switch operable from the exterior of the enclosure, or of a group of switches requiring substantial and large enclosure, is not accomplished merely by enlarging the simple box designs heretofore employed. Size alone requires different techniques of construction, and strength and durability must be incorporated without unduly increasing wall thicknesses and the size of other parts of the structure, for then the resultant bulk may detract from the use of corrosive resistant resins.

The desirableness of utilizing the more corrosive resistant materials, such as certain resins, for enclosures for delicate electrical apparatus has persisted. In answer to this desire, the present invention provides a highly satisfactory enclosure.

SUMMARY OF THE INVENTION

The present invention resides in an enclosure suitable for electrical switches that has its components formed of a molded reinforced resin. The enclosure is of multiple parts assembled after molding, such parts including a backplate enclosing the rear of the device, an enclosure body presenting four sidewalls that receive and fit about the periphery of the backplate, a sealing material joining the backplate to the body, and a cover that fits over the front opening of the body which may be hinged in such manner that when the cover is closed the interior is fully sealed.

For motor control apparatus employing disconnect switches, or other safety devices such as circuit breakers of fuse links, operable from outside the apparatus enclosure, it is desirable to have a front wall that mounts an operating handle. Such handle is separate from the cover, and hence the cover only encloses a part of the front, so that there is a front wall portion integral with the sidewalls that overlies the interior of the enclosure. This presents a complex configuration that renders molding more difficult. To simplify molding, the enclosure of the invention has a back part separate from the sidewalls and a special manner of joining them is introduced.

2

Also, the cover may be hinged in a manner that does not introduce complex molding problems. The result is to achieve an enclosure of large overall dimensions that has a more complex configuration than enclosures heretofore molded for smaller electrical devices.

Enclosure of the invention have proven superior to normally accepted enclosures, largely because of the ability to utilize molded resins. One resin that has satisfactorily been employed is a glass-reinforced polyester. Tests consisting of immersion in solutions of sulfuric acid and soduim hydroxide for 30 days show only slight color changes, and enclosed equipment remains untouched. It is a prime objective of the invention to provide an enclosure of high resistance to corrosion, and this is accomplished by structural innovations that make molded resins applicable to larger size enclosures.

Other objects of the invention include the provision of tight liquid and dust seals for an enclosure of the class described, a molded construction of substantially uniform thickness without abnormally large bulk regions which would create problems of resin curing, a hinge structure for an enclosure that is tight against liquids and gases, and the provision of mounting feet which have openings totally outside the enclosure, but which do not increase the overall dimensions of the enclosure. Still further objects are to provide an enclosure that is of light weight, strong and durable, and of components that can be readily molded without resort to overly complex dies.

The foregoing and other objects and advantages of this invention will appear from the following description, in which description reference is made to the accompanying drawings which show by way of illustration and not of limitation a preferred embodiment of the invention. Such embodiment does not represent the full scope of the invention, rather the invention may be employed in a variety of embodiments, and reference is made to the claims herein for interpreting the breadth of the invention.

BRIEF DESCRIPTION OF THE DRAWINGS

FIG. 1 is a front view with parts broken away and in section of an enclosure embodying the invention, FIG. 2 is a rear view of the enclosure of FIG. 1 with a portion of a sealer resin broken away to expose underlying construction, FIG. 3 is a view in section of the enclosure taken through the plane 3—3 indicated in FIG. 1, FIG. 4 is a view in section of the enclosure taken through the plane 4—4 indicated in FIG. 1, FIG. 5 is a further view in section of the enclosure taken through the plane 5—5 indicated in FIG. 4, FIG. 6 is a fragmentary view of an edge construction of the enclosure which is in section and taken through the plane 6—6 indicated in FIG. 2, FIG. 7 is a further fragmentary view of edge construction for the enclosure which is taken through the plane 7—7 indicated in FIG. 2, FIG. 8 is a fragmentary view in section of a rear corner construction for the enclosure taken through the plane 8—8 indicated in FIG. 2.

FIG. 9 is a fragmentary view in section of the parts shown in FIG. 8 prior to assembly, FIG. 10 is a fragmentary view of a rear corner of a sidewall component of the enclosure as seen through the plane 10—10 in FIG. 9, FIG. 11 is an enlarged fragmentary view in section of the edge of the cover forming a part of the enclosure, FIG. 12 is a view in section of a hinge forming a part of the enclosure as taken through the plane 12—12 indicated in FIG. 1.

DESCRIPTION OF THE PREFERRED EMBODIMENT

Figure 5:
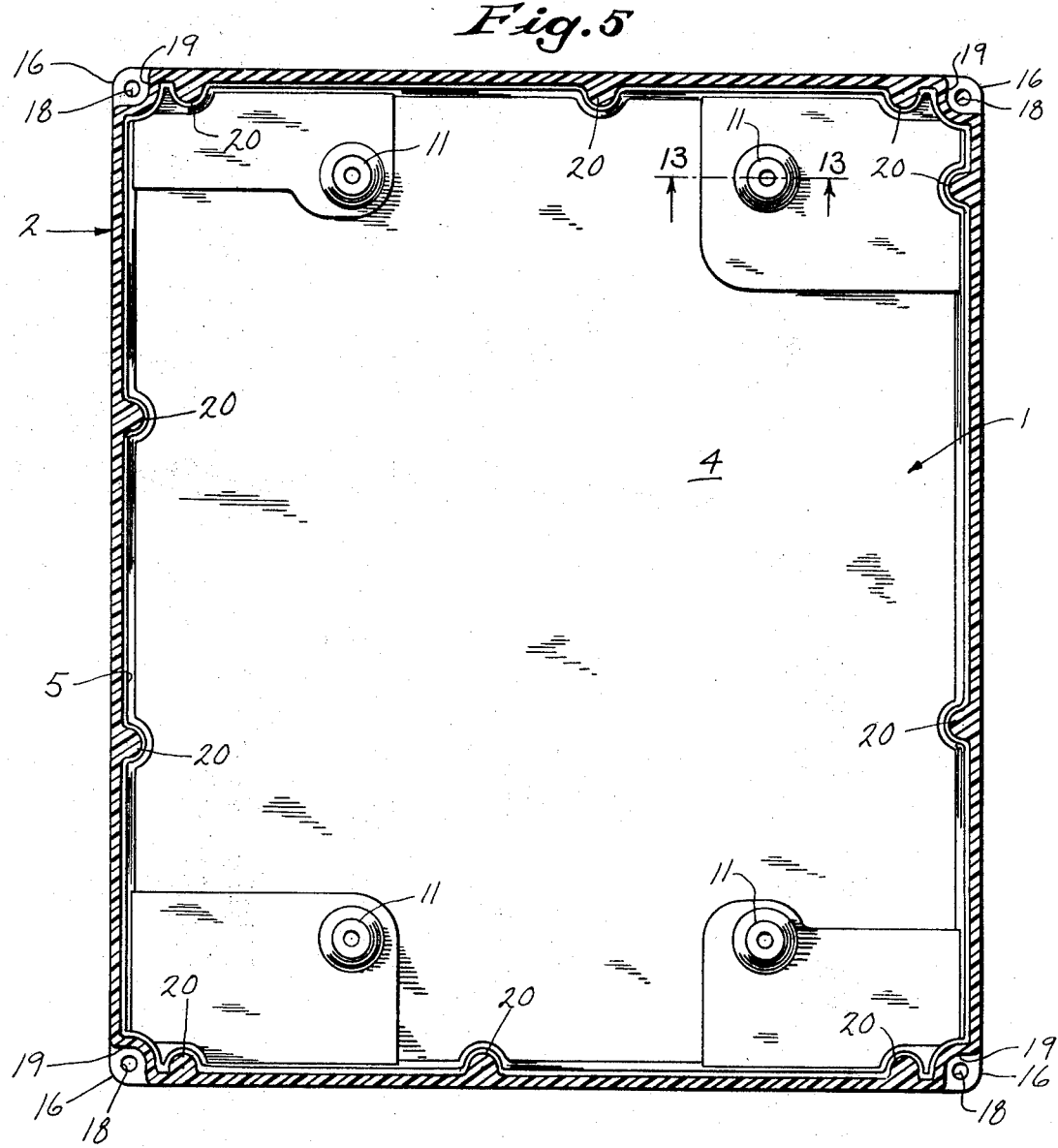
FIG. 5 is a further view in section of the enclosure

Referring now to the drawings, the enclosure shown is suitable for housing electrical apparatus such as an across-the-line motor starting switch together with a safety device such as a circuit breaker and associated control relays for automatic operation of the motor starting switch. The invention is not restricted to the type of apparatus that is to be housed therein and for this reason no specific apparatus is indicated in the drawings. The enclosure is made up of three principal components that comprise a backplate 1, an enclosure body 2 comprising four sidewalls, and a cover 3 that is hingedly mounted and can be swung closed to complete a fully enclosed structure that is corrosive resistant and tight against liquid and dust. The backplate 1 has a large, panel like backwall 4 that encloses the rear of the structure, and as shown in FIG. 2 it presents a flat surface for the rear of the enclosure. Referring now to FIG. 6, it is seen that the backwall 4 has a forwardly turned flange 5 extending around its periphery, and that at the rear edge of the flange 5 there is formed a recess 6. At spaced points along the periphery of the backplate 1 provision is made for receipt of assembly bolts 7, as seen in FIG. 7. These bolts are utilized to enhance the structural strength of the enclosure, but they may be dispensed with if the additional strength is not required. For example, in smaller enclosures that house a lesser amount of apparatus the size of the backplate 1 and enclosure body 2 may be reduced so that assembly bolts 7 are not required in order to obtain adequate structural strength.

At the four corners of the backplate 1 there are integrally formed a set of four mounting feet 8, the configuration of which is particularly shown in FIGS. 2, 8 and 9. Each mounting foot 8 lies to the outside of the forwardly turned flange 5, and the flange 5 is set back a slight distance at each corner to accommodate the associated mounting foot 8. The recess 6 is continued through each mounting foot 8, as indicated in FIG. 8, and a filler opening 9 is provided in each mounting foot 8 to communicate with the recess 6. Each mounting foot 8 also includes a mounting hole 10 through which suitable mounting bolts may be passed for securing the enclosure of the invention to some supporting wall or framework.

Figure 13:
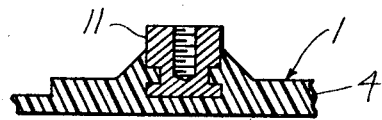
FIG. 13 is a fragmentary view in section of a switch mounting stud taken through the plane 13—13 indicated in FIG. 5.

The backplate 1 supports a set of four mounting studs 11, the position of which is shown in FIG. 5. A mounting stud 11 is shown in section in FIG. 13, and it is seen that it is a metallic insert with a base portion embedded in the resin composition forming the backwall 4. The resin of the backwall 4 completely covers over the rear of stud 11 so that the stud 11 is shielded from exposure to the exterior of the structure. The stud 11 has a suitable threaded opening facing the interior of the structure so that electrical apparatus, or some other item, may be mounted upon the backwall 4. The material for the mounting studs 11 is preferable more rigid than a molding resin which comprises the enclosure of the invention, so that rigid attachment can be made for the apparatus mounted within the enclosure. Metal is preferable, but such a metal must be remote from corrosive atmospheres in which the structure may be located, and for this reason the rear portion of each mounting stud 11 is fully shielded from the exterior.

The enclosure body 2 has sidewalls 12 with rear margins 13, see particularly FIGS. 6 and 7, of slightly reduced cross section that fit snugly about the forwardly turned flange 5 of the back plate 1. The after edge 14 of each rear margin 13 is opposite the recess 6 so that each rear margin 13 cooperates with the recess 6 to form a narrow channel around the enclosure which is defined by both the backplate 1 and the enclosure body 2. Upon assembly of the backplate 1 into the enclosure body 2 with a close fitting of the flange 5 with the rear margins 13 of the sidewalls 12 the recess 6 is filled with a suitable sealing material 15. An epoxy resin is suggested, which is poured into the recess 6 and allowed to harden in situ to form a tight bond between the backplate 1 and enclosure body 2 of high structural strength that is also liquid, dust and gastight.

Referring back to FIGS. 8 and 9 together with FIG. 10, it is seen that the rear corners of the enclosure body 2 are formed with mounting feet 16 that are positioned directly forward of the mounting feet 8 of the backplate 1. These mounting feet 16 lie to the outside of the flange 5, and they include a groove 17 along their inner edges which lie adjacent the recess 6. When the backplate 1 and enclosure body 2 are assembled the grooves 17 and the recess 6 form a cavity into which the epoxy sealer is introduced through the filler openings 9, and in this fashion the bonding seal between the parts is made continuous.

The mounting feet 16 of the enclosure body 2 have suitable mounting openings 18 that form extensions of the openings 9 in the feet 8, and hence when the enclosure of the invention is mounted both the backplate 1 and enclosure body 2 are held firmly by the mounting bolts employed.

In smaller enclosures, not requiring the same degree of support, the mounting feet 16 of the enclosure body 2 can be dispensed with. In any event, mounting is facilitated by forming a concave depression 19 along each corner edge of the body 2, as shown in FIGS. 1 and 5, which expose the mounting feet from the front of the enclosure. In this fashion, the mounting feet are incorporated within the overall width and height of the enclosure.

The interior surfaces of the sidewalls 12 are formed with a series of pilasters 20 which lend some structural strength to the sidewalls 12, and which terminate at their after ends in the plane to which the forward edge of the flange 5 is brought in assembly. The pilasters 20 therefore aid in limiting the inward extent of the back plate 1, so that internal dimensions for the enclosure are carefully maintained. In some designs of the invention, the rear margins 13 may not be of reduced cross section, as indicated in FIGS. 6 and 7 for the embodiment described, and in such instances the pilasters 20 become the sole structure for controlling the degree of insertion of the backplate 1.

The enclosure body 2 has a front wall 21 that has a large opening giving access to the interior of the structure. The opening defined by the front wall 21 is normally closed by the cover 3, and a set of suitable cover screws 22 are provided for securing the cover tightly in place. A suitable flexible gasket 23 is cemented in the edge of the cover 3 as particularly shown in FIG. 11 to perfect a liquid and dust seal. The cover 3 is mounted upon the enclosure body 2 by hinges 24. Each hinge 24 has a first hinge strap 25 that is integrally molded with the enclosure body 2 and a second hinge strap 26 that is integrally molded with the cover 3, and reference is made to FIG. 12 for the details of the hinge construction. Each hinge strap 25, 26 is formed with cross ribbing in its interior. The purpose of the cross ribbing is to reduce the cross section area, or thickness, of the hinge straps so as to be of the same order as thickness of other parts of the structure. As a result, the cure time for the resin from which the structure is molded will be substantially uniform throughout and this permits of the integral molding of the hinge strap with the other portions of the structure. In assembling the cover 3 to the enclosure body 2, a hinge pin 27 is first inserted in each hinge strap 25 that is of a noncorrosive material similar to that employed for the other parts of the structure. The interstices between the cross ribbing of each hinge strap 25 is then filled with a sealer like that used in the recess 6, for example, a suitable epoxy. This sealer holds the hinge pins 27 in place and also provides a liquid, dust and gastight hinge fitting. The cover 3 is now placed on the hinge pins 27, and it will be noted that in FIGS. 1 and 4 there is shown a projection 28 on the inside of the cover 3 which precludes removal of the cover from the hinge pins until the cover is swung open a substantial distance, The purpose of the projection 28 is to supplement a disconnect handle 29 mounted on the front wall 21, as shown in FIG. 1. The construction of such a disconnect handle 29 is well known in the art, and need not be repeated in the drawings, and it is suffice to say that it interlocks with electrical apparatus within the enclosure to preclude opening of the cover 3 unless the electrical apparatus is in an off or open circuit position. The disconnect handle 29 has a gasket 30 to provide an adequate seal, and it is mounted by screws inserted from the interior of the cabinet that are positioned inside the area afforded by the gasket 30.

Figure 14:
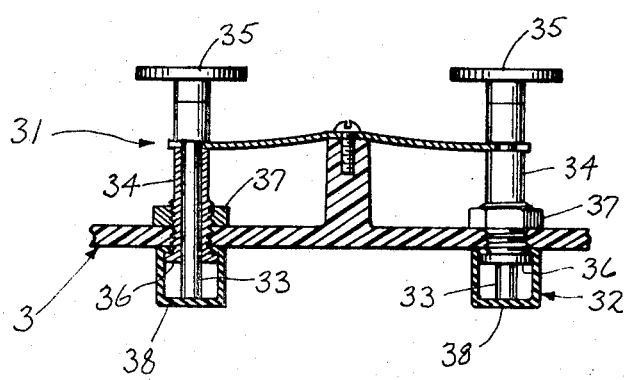
FIG. 14 is a view in cross section of a manually operable pushbutton structure mounted on the cover of the enclosure taken through the plane 14–14 indicated in FIG. 1.

It is commonly desired to have some form of pushbutton control for actuating a part of the electrical apparatus housed within the enclosure, and for this purpose there is illustrated in FIG. 14 a tightly sealed pushbutton construction that comprises a pair of pushbuttons 31 and 32. Each pushbutton 31, 32 has a depressible plunger 33 that passes through a bushing 34 to end in a mushroom-shaped head 35 which will contact a switch actuator when depressed. The bushing 34 has a head 36 which lies to the outside of the cover 3 and it is brought up tight by a nut 37. A flexible, cup-shaped cover 38 of corrosion-resistant material encapsulates the outer end of the plunger 33 and has its peripheral edge held tight between the bushing head 36 and the cover 3. In this fashion, a liquid and dusttight construction is attained for the pushbutton controls.

The principal parts of the enclosure, namely the backplate 1, enclosure body 2 and cover 3 are each formed as a unitary member of a molded resin. Such resin is preferably reinforced by glass fibers that are adequately intermixed within the resin, and a suitable resin which has been employed with satisfaction is a polyester. Another resin which might be considered is polyvinylchloride. A polyester, however, is of a thermosetting nature and may withstand higher temperatures without degrading. Additives can also be mixed with the resin to improve corrosion and flame resistance. The particular formulation is not a part of the present invention and is only referred to herein by way of reference.

Of particular significance, is that the three main component parts, the backplate 1, enclosure body 2 and cover 3, can be molded by molds that open by straight release from one another in a single line of movement, and without any complex inserts which would be necessary if the parts had openings extending sidewise of the direction of mold movement. Even the cross ribbing in the hinge straps are such that the interstices therebetween open in the direction of mold movement. Hence, a complex enclosure is provided with an overhanging front wall, but which can be molded without undue complexity.

A tight enclosure of high corrosion resistance has been described herein. It has been a particular purpose to provide such an enclosure for electrical apparatus that has been used in aggressive atmospheres that corrode usual enclosure materials. The invention teaches aspects of structure which advantageously permit the use of molded resin materials which have the desired corrosion resistant characteristics.

We claim:

1. In a switch enclosure the combination comprising:
   a unitary backplate of molded reinforced resin with a backwall and a forwardly turned flange about the perimeter of the backwall that includes a recess along the back outer edge of the turned flange;
   a unitary enclosure body of molded reinforced resin with sidewalls that meet with one another at their ends to form a body closed around its sides and open at the top and bottom;
   the sidewalls of said body having rear margins that encircle said turned flange of said backplate and extend along said recess forming a wall portion therefor;
   a sealer deposited in said recess forming a tight seal between said backplate and said enclosure body; and
   a unitary cover of molded reinforced resin that fits over the front opening of said enclosure body with a sealing gasket between the enclosure body and cover.

2. A switch enclosure as in claim 1 wherein said enclosure body has concavity along each side edge and a mounting foot at the after end of each concavity which is within the overall width and height of the switch enclosure.

3. A switch enclosure as in claim 1 wherein said enclosure body has a first mounting foot lying outside the area enclosed by said recess, and there is a filling opening in said backplate that leads to said recess at the vicinity of said overlapping second mounting foot.

4. A switch enclosure as in claim 1 wherein a first hinge strap is molded integrally as a part of said enclosure body with the internal part thereof being cross ribbed, a second hinge strap is molded integrally as a part of said cover with the integral part thereof being cross ribbed, a hinge pin is inserted in said first hinge strap and the interstices between cross ribbing of said first strap is filled with a sealer, and said second hinge strap having a longitudinal opening fitting over said hinge pin.

5. A switch enclosure as in claim 1 having switch mounting metallic inserts molded within the backwall having threaded openings facing into the switch enclosure and having the portion inserted in the resin of the backwall shielded by the resin from exposure to the exterior of the switch enclosure.

6. In a switch enclosure the combination comprising:
   a reinforced resin backplate member with a rear wall for enclosing the back of the enclosure;
   a reinforced resin unitary enclosure body having four sidewall portions that mate with said backplate member and a front wall with an opening therein, said enclosure body having the sidewall portions mating with the backplate member sealed therewith by a sealer material;
   a reinforced resin cover hinged to said enclosure body for enclosing the opening in said front wall;
   an operating handle mounted on said front wall with portions extending into said enclosure through a tight rotatable pin, said handle having a seal between it and the front wall with mounting screws inserted into the handle from within the enclosure and inside the area of said seal; and
   operating buttons on the outside of said cover with actuators extending through the cover and, in which flexible seals encapsulate the parts of said buttons protruding from said cover.

7. A switch enclosure as in claim 6 having a series of pilasters on the inside surfaces of said sidewall portions that terminate at their after ends at a point which limits insertion of said back plate member into the enclosure body.

PO-1050
(5/69)

UNITED STATES PATENT OFFICE
CERTIFICATE OF CORRECTION

Patent No. 3,578,933  Dated May 18, 1971

Inventor(s) Woodrow A. DeSmidt and Edward H. Kuhn

It is certified that error appears in the above-identified patent and that said Letters Patent are hereby corrected as shown below:

Column 1, delete lines 19 and 20

Column 1, line 66, "of" should read ---or---

Column 2, line 6, "Enclosure" should read ---Enclosures---

Column 2, line 50, delete "FIG. 5 is a further view in section of the enclosure"

Column 3, line 57, "preferable" should read ---preferably---

Column 5, line 21, "dusttight" should read ---dust tight---

Column 5, line 37, after "by" ---a--- should appear

Column 6, line 5, after "said" ---enclosure--- should appear

Column 6, line 19, after "recess," ---said back plate having a second mounting foot that overlies said first mounting foot and which is also outside the area enclosed by said recess,--- should appear Signed and sealed this 24th day of August 1971.

(SEAL)
Attest:

EDWARD M. FLETCHER, JR.
Attesting Officer

WILLIAM E. SCHUYLER, JR.
Commissioner of Patents